May 5, 1936.  G. F. DRAKE  2,039,300
CONTROL FOR AIR CONDITIONING SYSTEMS
Filed Feb. 29, 1932  2 Sheets-Sheet 2
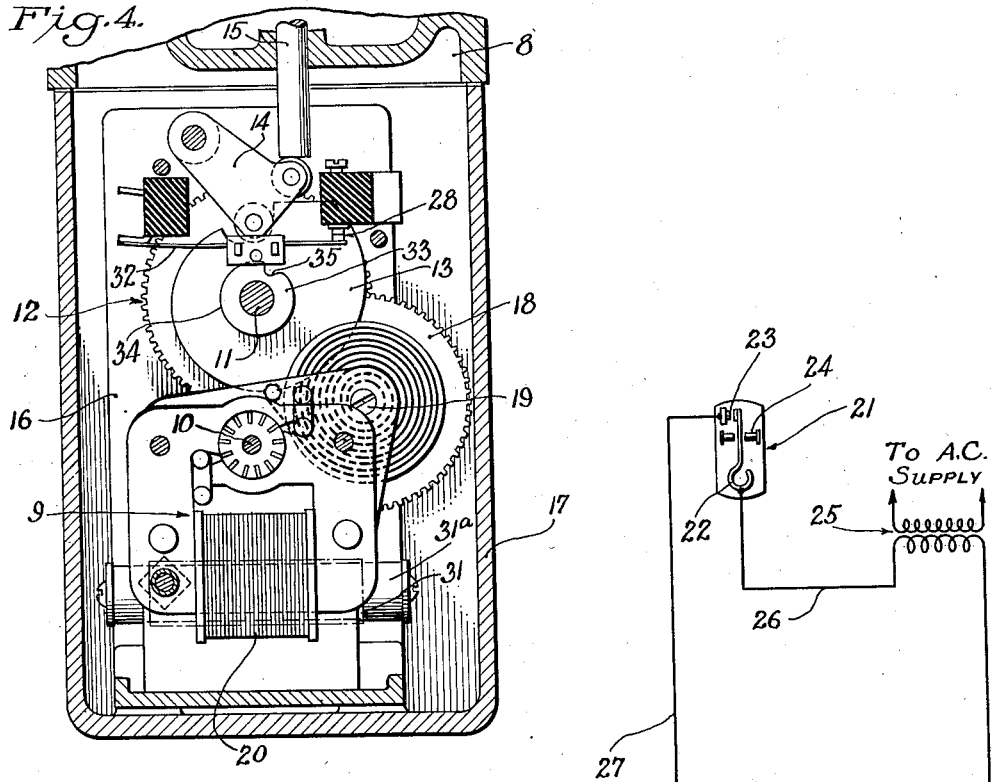
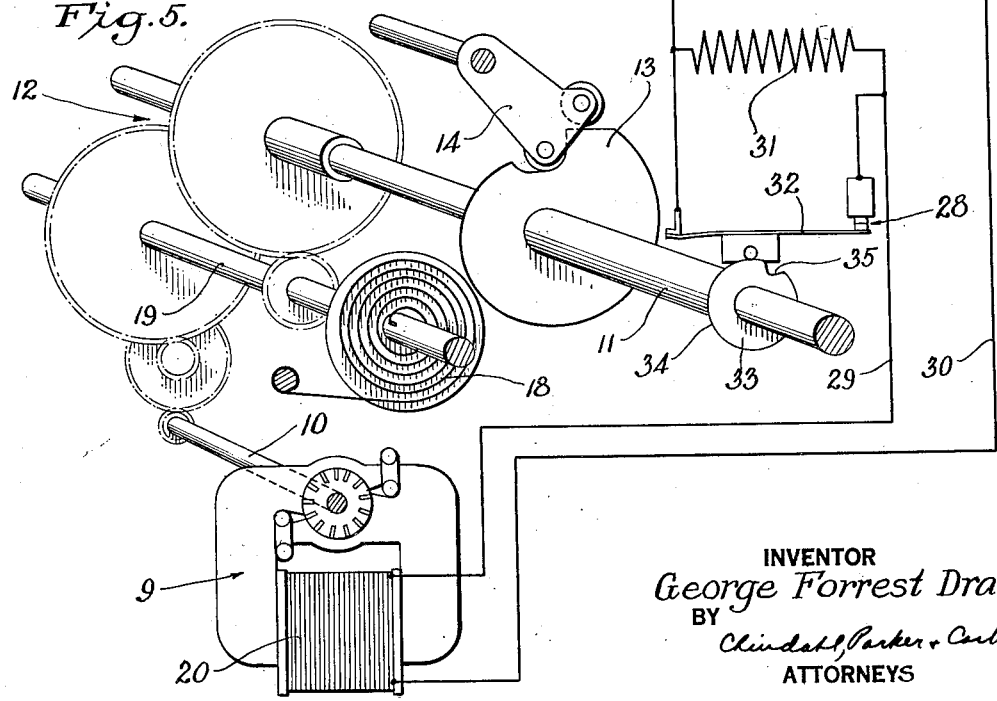
INVENTOR
George Forrest Drake
BY
Chindahl, Parker + Carlson
ATTORNEYS Patented May 5, 1936

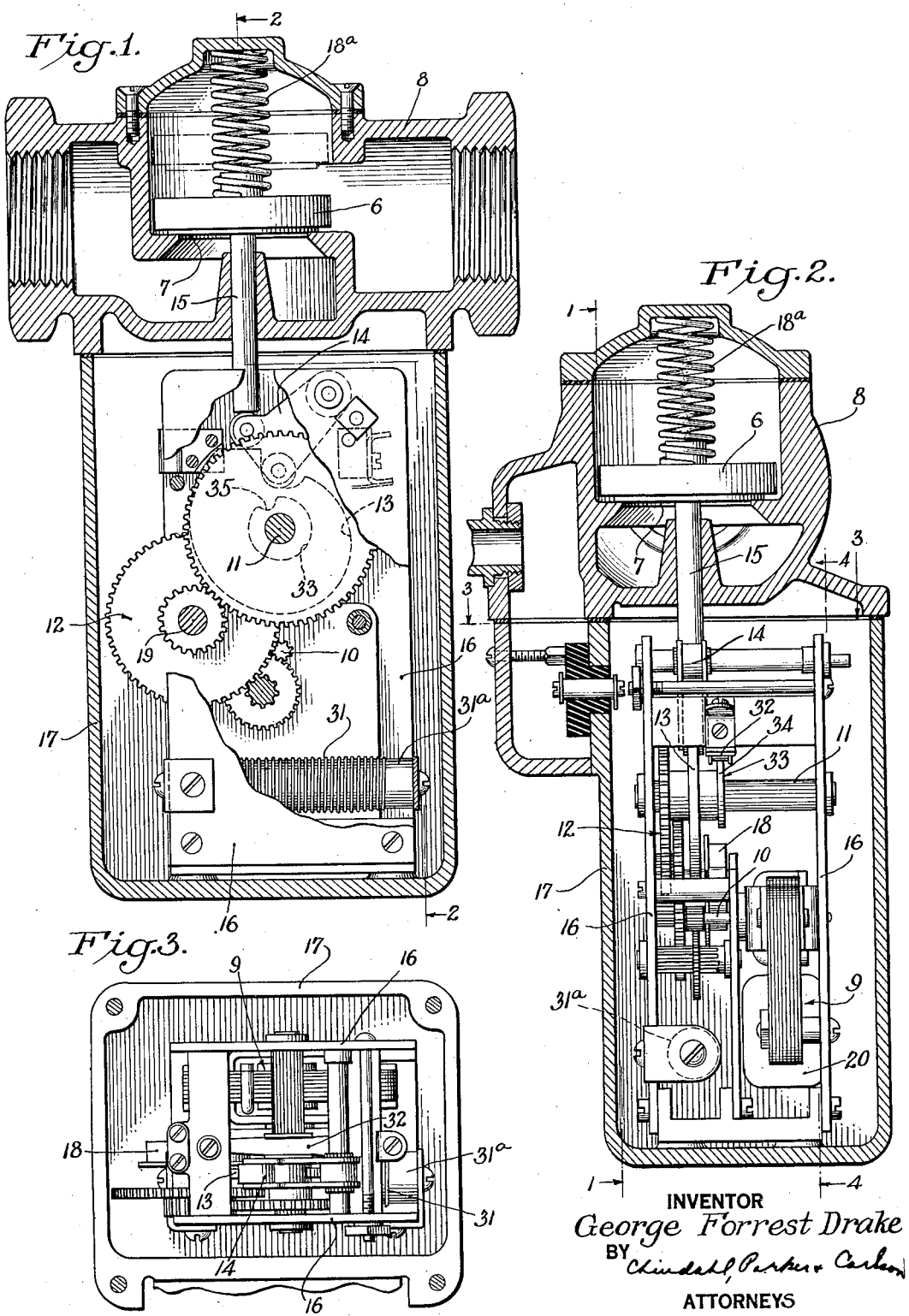

2,039,300

UNITED STATES PATENT OFFICE 2,039,300

CONTROL FOR AIR CONDITIONING SYSTEMS

George Forrest Drake, Rockford, Ill., assignor to Howard D. Colman, Rockford, Ill.

Application February 29, 1932, Serial No. 595,718

8 Claims. (Cl. 236—74)

This invention relates to the control of a damper, valve or other device for regulating the operation of air conditioning apparatus under the control of a sensitive instrument such as a thermostat and has more particular reference to a control system in which the regulating device is actuated by an electric motor.

Control systems have been proposed heretofore in which the regulating device normally tends to move to an inactive position and is moved to an active position by the motor which is then stalled and maintains the device in active position so long as the motor circuit is maintained closed by the thermostat. In such a system, the full current of the motor is carried by the thermostat while the device is active resulting in rapid deterioration of the thermostat switch.

The primary object of the present invention is to overcome the objection above mentioned by providing for reduction in the current burden on the sensitive control instrument while the regulating device is in active position.

A more detailed object is to provide, in a system of the above character, a resistance element which is interposed in the circuit of the driving motor automatically when the regulating device has reached a predetermined position and acts to reduce the current in said circuit without permitting reverse movement of the regulating device.

The invention also resides in the novel manner in which the resistance element is rendered effectual and ineffectual.

Other objects and advantages of the invention will become apparent from the following detailed description taken in connection with the accompanying drawings, in which Figure 1 is a sectional view taken substantially along the line 1—1 of Fig. 2 of a heat regulating device arranged to be controlled in accordance with the present invention.

Fig. 2 is a sectional view taken along the line 2—2 of Fig. 1.

Figs. 3 and 4 are views taken along the lines 3—3 and 4—4 respectively of Fig. 2.

Fig. 5 is a schematic view and wiring diagram of the improved system.

In the form shown in the drawings, the heat regulating device is in the form of a valve comprising a disk 6 movable toward and away from closed position against a seat 7 to interrupt and resume the flow of fuel through the valve body 8 interposed in a feed line leading to a burner (not shown). Movement of the valve disk away from inactive or closed position is accomplished by a small fractional horse power electric motor 9 preferably of the shading ring induction type having its shaft 10 connected to a main operating shaft 11 through the medium of a train 12 of speed-reduction gears. During movement of the shaft 11 away from the valve-closed position shown in Fig. 5, a cam 13 fast on the shaft acts through the medium of a pivoted follower 14 and a stem 15 to raise the valve disk 6 a predetermined distance. All of the rotary parts may be supported between two frame plates 16 enclosed by a casing 17 which is secured to the valve body.

The valve disk 6 is normally urged toward inactive position which is accomplished, in the present instance, by a spring 18 coiled around and acting on an intermediate shaft 19 of the speed-reduction gearing. A second spring 18ª acts in compression on the valve disk to seat the same.

Energization of the winding 20 of the motor to open the valve is controlled by a thermostat 21 having a thermal element 22 adapted to close a switch 23 when the space heated by the system falls below a temperature predetermined by the setting of the thermostat and to open the switch when the surrounding temperature rises above such predetermined value. A magnetic set device 24 acting on the thermostatic tongue as an armature serves to prevent chattering of the switch contacts.

When the thermostat calls for heat with the valve closed as shown in the drawings, a circuit for the motor winding is closed from one terminal of a source of current 25, a conductor 26, a switch 23, a conductor 27, a switch 28, a conductor 29, winding 20, a conductor 30 to the current source. The full voltage of the current source is thus applied to the motor which starts to rotate in a direction to open the valve against the action of the spring 18 thereby increasing the amount of heat supplied by the system.

Means is provided for stopping the motor when the valve reaches fully open position (shown in dotted outline in Fig. 1) and for decreasing the current flowing in the motor circuit while maintaining the motor energized at least to the degree necessary to hold the valve open against the action of the spring 18 so long as the thermostat switch 23 remains closed. In the present instance, this means comprises a resistance element 31 adapted to be interposed in the active motor circuit as an incident to movement of the valve into open position. Herein the element 31 is in the form of a wire coiled around a bar 31ª of insulation supported by the frame of the valve operator.

To simplify the switching mechanism required to render the resistance element 31 effectual and ineffectual, the element is preferably connected in parallel with the switch 28 by joining its opposite terminals to the conductors 27 and 29. The resistance is thus permanently connected in the motor circuit and is arranged to be rendered ineffectual by establishing a short circuit around the resistance through closure of the switch 28. The movable contact of the latter is carried by an arm 32 constituting the follower of a cam 33, the surface 34 of which acts to maintain the switch closed during movement of the valve from closed to open position thereby causing the full voltage of the current source to be applied to the motor winding when the thermostat switch 23 is closed. As the valve reaches open position and the follower 14 encounters the high part of the cam 13, a notch 35 in the cam 33 is presented to the follower 32 allowing the switch 28 to open thereby interrupting the short circuit around the resistance 31. The latter thus becomes effectual in reducing the voltage applied to the motor winding 20 and therefore the current flowing through the thermostat. The switch 28 is closed by the cam 33 as the shaft 11 is returned to valve-closing position by the spring 18 after the thermostat has opened the motor circuit.

In order that a maximum reduction in the current burden on the thermostat will be obtained with the arrangement above described, it is preferred to construct the element 31 of a resistance such that the motor will be incapable of moving the valve against the friction of the speed reduction gearing when the resistance is active but will develop sufficient power to hold the valve open against the action of the spring. With a motor of the type illustrated herein, the voltage may be reduced nearly fifty per cent but the motor will be stopped by a reduction of only twenty per cent.

It will be apparent from the foregoing that the valve will be opened by the motor whenever the thermostat 21 calls for heat and will be held open by the motor until the latter is deenergized either by opening of the thermostat switch 23 or by failure of the current supply. Upon such deenergization, the spring 18 becomes effective to rotate the parts of the operator back to valve-closed position during which the switch 28 will be closed to prepare the motor circuit for reopening of the valve when the thermostat again calls for heat or the voltage is restored. In view of the low magnitude of the current flowing through the thermostat switch 23 when the valve is open, the life of the thermostat is materially prolonged and a simple open-switch type of thermostat may be employed.

I claim as my invention:

1. In a heating system, the combination of a regulating device movable between active and inactive positions to interrupt or resume the supply of heat by said system, an electric motor for driving said device toward active position, said device normally tending to move toward inactive position when said motor is deenergized, an energizing circuit for said motor including a resistance element proportioned to prevent movement of the device by the motor when the resistance is in active series circuit with the motor winding but to permit the motor to maintain the position of the device, a thermostat acting directly to close and open said circuit respectively when the temperature in said space falls below and rises above a predetermined value, and means operated as an incident to movement of said device out of said active position to establish a short circuit around said resistance element and to interrupt said short circuit when said device moves into said active position.

2. In a heating system, the combination of a valve having a member movable between closed and a predetermined open position to regulate the amount of heat delivered by the system, an electric motor having a speed-reducing driving connection with said device and adapted when energized with the member in closed position to rotate in a direction to open the valve, a spring normally acting in a direction to urge said member toward closed position, a thermostat having a switch which is open and closed respectively when the temperature in the space heated by said system rises above and falls below a predetermined value, an electrical resistance adapted when in active series circuit with the winding of said motor to prevent movement of said device either by said motor or by said spring, an energizing circuit extending through said switch and said winding, a second circuit extending through said winding, said switch, and said resistance, and switching means operating as an incident to movement of said device into said open position and acting to render said first mentioned circuit ineffectual and said second circuit effectual.

3. In a heating system, the combination of a device regulating the amount of heat supplied by said system, a spring normally tending to move said device to an inactive position, an operator for said device including an electric motor rotatable in a direction to move said device out of said position, a thermostatically controlled switch adapted when closed to complete an energizing circuit for said motor, a resistance element adapted when in active series circuit with said motor to render the same incapable of effecting further movement of said device away from said position but capable of maintaining the position of the device against the action of said spring, and switching means maintaining said element ineffectual until said device has moved a predetermined distance away from said position and then to render the element effectual.

4. In a heating system, the combination with a heat regulating device, an electric motor for driving said device in one direction, said device moving in the opposite direction into a predetermined position when said motor is deenergized, a thermostat, an energizing circuit for said motor adapted to be closed directly by said thermostat when the temperature in the space heated by said system is below a predetermined value, and means operable after said device has been moved a predetermined distance away from said position to decrease the current flowing through said circuit while permitting said circuit to be maintained closed by said thermostat, said motor, when energized by the decreased current, constituting the sole means for preventing reverse movement of said device.

5. In a heating system, the combination of a regulating device normally tending to move toward a predetermined position, an electric motor for moving said device away from said position, a thermostat, an energizing circuit for the winding of said motor adapted to be closed directly by said thermostat and including a resistance element, and means for maintaining a short circuit around said element while said device is in said position and during movement of the device through a predetermined distance away from said position, said element acting upon interruption of said short circuit to reduce the magnitude of the current flowing through said thermostat, and said motor, when energized through said element, constituting the sole means for preventing reverse movement of said device.

6. In a temperature control system, the combination of a control device normally tending to move toward a predetermined position, an electric motor for driving said device away from said position, a source of electric current, a control switch, a thermo-sensitive element for imparting actuating movements to said switch to open and close the same, an energizing circuit for said motor including said source of current and said switch, and means controlling said circuit and operating automatically upon movement of said device through a predetermined distance away from said position to reduce the voltage applied to said motor and the current flowing through said switch while the switch continues to maintain the motor energized, said motor, when energized at the reduced voltage, constituting the sole means for preventing reverse movement of said control device.

7. In a temperature control system, the combination of a control device normally under a force tending to move the device toward a predetermined position, electric driving means arranged to move said device away from said position against said force, a source of electric current, a control switch, a thermosensitive element arranged to impart actuating movements to said switch to open and close the latter, an energizing circuit for said driving means including said source of current and said switch, an electrical resistance element, and means operable to interpose said element in said circuit upon movement of said device by the driving means through a predetermined distance away from said position whereby to reduce the voltage applied to said motor and the current flowing through said switch, said element having a resistance value such as to permit continued energization of said driving means to a degree sufficient to maintain the position of said device against said force.

8. In an air conditioning system, the combination of a control device under a force urging the device toward a predetermined position, electric motor driving means for moving said device away from said position, a source of electric current, a control switch, a sensitive air condition responsive element for automatically imparting actuating movements to said switch to open and close the same, an energizing circuit for said driving means including said source of current and said switch, and means operating automatically upon movement of said device a predetermined distance away from said position to increase the resistance of said circuit and thereby reduce the magnitude of the current through said driving means and said switch, the reduced current energizing said driving means to a degree sufficient to enable the driving means to maintain the position of said device against said force.

GEORGE FORREST DRAKE.